H. A. MAURER.
PLOW ATTACHMENT.
APPLICATION FILED FEB. 26, 1912.
1,091,151.
Patented Mar. 24, 1914.
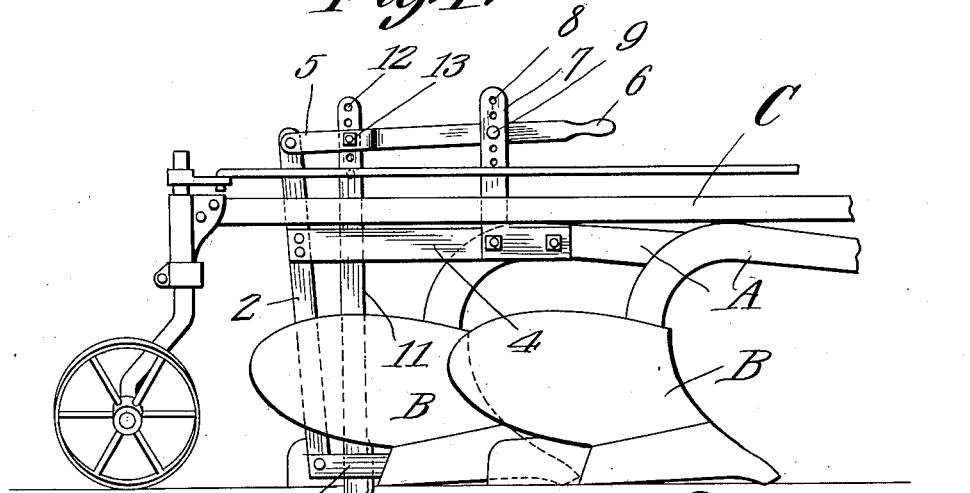
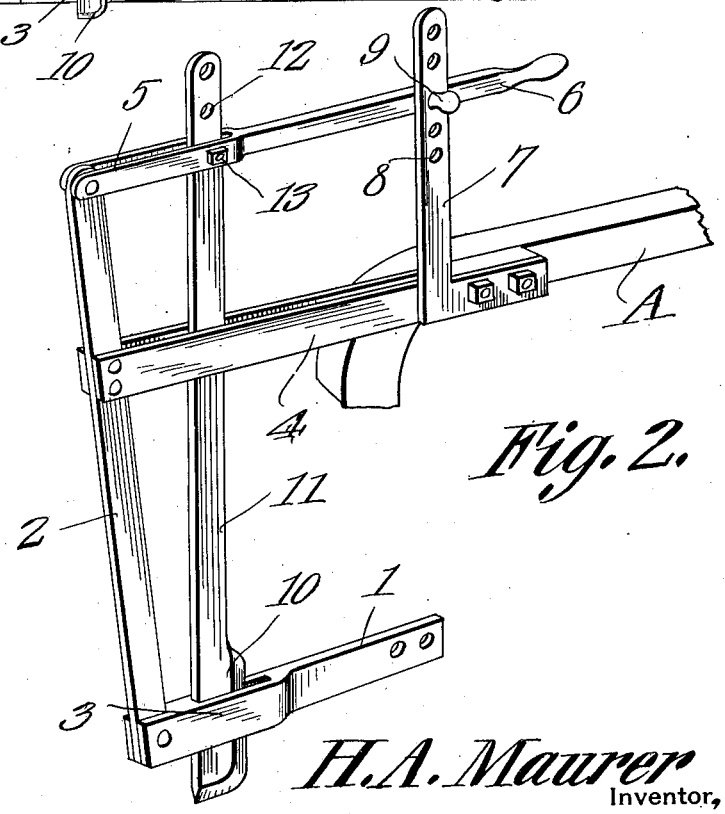
H. A. Maurer, Inventor,
by C. A. Snow & Co.
Attorneys.
Witnesses

UNITED STATES PATENT OFFICE.

HERMAN A. MAURER, OF ROCKLYN, WASHINGTON.

PLOW ATTACHMENT.

1,091,151. Specification of Letters Patent. Patented Mar. 24, 1914.

Application filed February 26, 1912. Serial No. 680,025.

*To all whom it may concern:*

Be it known that I, HERMAN A. MAURER, a citizen of the United States, residing at Rocklyn, in the county of Lincoln and State of Washington, have invented a new and useful Plow Attachment, of which the following is a specification.

This invention relates to an attachment for plows and is more particularly designed for use in connection with gang plows, one object of the invention being to provide simple means for attachment to the rearmost plow of a gang for cutting into the soil and thus preventing the plows from shifting laterally while operating on the side of a hill and under which condition it is usually necessary to plow deeper than on level ground so as to prevent lateral shifting of the plows.

Another object is to provide an attachment of this type which is simple in construction and which can be applied readily to plows already in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a side elevation of a portion of a gang of plows and showing the attachment applied to the rearmost plow of the gang. Fig. 2 is an enlarged perspective view of the attachment, a portion of the stock of the rear plow being shown.

Referring to the figures by characters of reference A designates the stocks of the plows B of a gang and C designates a portion of the frame of a gang plow.

The attachment constituting the present invention includes a forked guide arm 1 adapted to be secured between the landside and the stock of the rearmost plow, there being a standard 2 secured at its lower end within the end of the fork 3 of the arm and extending upwardly through the rear end of an upper forked guide member 4. This upper member is bolted or otherwise secured to the upper portion of the stock A of the rearmost plow and the upper end of the standard is pivotally engaged by the forked end 5 of a lever 6. A standard 7 is secured to and projects upwardly from the front portion of the guide 4 and has a plurality of openings 8 any one of which is adapted to receive a holding pin 9 which is insertible into the lever 6. It is to be understood of course that any other desired means may be used in lieu of the pin 9 and the openings 8 for holding the lever 6 in any desired position relative to the standard 7.

A blade 10 is slidably mounted within the forked portion 3 of the lower guide 1 and has its front and bottom edges sharpened. This blade is formed at the lower end of a strip 11 which extends loosely through the upper guide 4 and is pivotally mounted within the forked portion 5 of lever 6, there being a series of openings 12 within the upper portion of the strip 11 and any one of which is adapted to receive the connecting bolt 13.

It will be apparent that, when lever 6 is pushed downwardly at its forward end, the strip 11 will be likewise moved downwardly, thereby bringing blade 10 into engagement with the soil. This blade can be forced to any desired depth and will, obviously, prevent the rearmost plow B from shifting laterally while the side of a hill is being plowed. Thus all of the plows of the gang can be caused to produce furrows of uniform depth whether used on inclined or level ground and said plows can always be kept in proper line. While the plows are in use on level ground the blade 10 can be elevated so as to be out of engagement with the soil.

The blade 10 is of course to be of sufficient stiffness to withstand the severe lateral strain to which it will be subjected while in use and, as the lower guide member 1 is supported close to the ground, it will be seen that said guide member will serve to reinforce the blade 10 and thereby reduce to the minimum all danger of breaking.

It will be seen that the attachment constituting the present invention can be applied readily to plows already in use.

What is claimed is:—

An attachment for plows including an upper forked guide member adapted to be secured at its front end to a plow beam, a standard fixedly connected to one end thereof and extending upwardly and downwardly therefrom, a second standard fixedly connected to the other end thereof, a lower forked guide arm connected to the lower end of the first named standard and adapted to be secured at its front end to the plow, a lever pivotally connected to the upper end of said standard, means carried by the lever for adjustably engaging the second standard, a strip slidably mounted in the upper forked guide and pivotally and adjustably connected to the lever, and a flat blade at the lower end of and alining with the strip and slidably mounted in the lower forked guide, said blade having a sharp front and lower edge.

In testimony that I claim the foregoing as my own, I have hereto affixed my signature in the presence of two witnesses.

HERMAN A. MAURER.

Witnesses:
EMEL KRUGER,
EDWARD W. MULKE.

Copies of this patent may be obtained for five cents each, by addressing the "Commissioner of Patents, Washington, D. C."